United States Patent
Martin et al.

(10) Patent No.: US 10,677,279 B2
(45) Date of Patent: Jun. 9, 2020

(54) SNAP RING ASSEMBLY

(71) Applicant: Caterpillar Inc., Peoria, IL (US)

(72) Inventors: Kevin L. Martin, Washburn, IL (US);
Ryan Antony Lozier, Peoria, IL (US);
Paul Arthur Zwart, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 277 days.

(21) Appl. No.: 15/798,440

(22) Filed: Oct. 31, 2017

(65) Prior Publication Data
US 2019/0128308 A1 May 2, 2019

(51) Int. Cl.
| | |
|---|---|
| *F16H 55/00* | (2006.01) |
| *F16B 21/18* | (2006.01) |
| *F16D 3/06* | (2006.01) |
| *G05B 19/4099* | (2006.01) |
| *F16B 5/06* | (2006.01) |
| *G06F 30/17* | (2020.01) |
| *G06F 119/18* | (2020.01) |

(52) U.S. Cl.
CPC .......... *F16B 21/186* (2013.01); *F16B 5/0664* (2013.01); *F16D 3/06* (2013.01); *G05B 19/4099* (2013.01); *G06F 30/17* (2020.01); *F16B 2200/30* (2018.08); *G05B 2219/49023* (2013.01); *G06F 2119/18* (2020.01)

(58) Field of Classification Search
CPC ................. F16B 43/007; F16B 37/0892; F16B 2200/30; F16B 5/0664; F16B 21/18; F16B 21/186
See application file for complete search history.

(56) References Cited

U.S. PATENT DOCUMENTS

| | | | |
|---|---|---|---|
| 1,452,492 A | 4/1923 | Carpenter | |
| 1,638,209 A * | 8/1927 | Niebuhr | F16B 21/18 411/532 |
| 2,047,706 A * | 7/1936 | Reed | F16B 21/18 384/425 |
| 2,476,586 A | 7/1949 | Darash | |
| 2,999,412 A | 9/1961 | Martens | |
| 3,491,647 A * | 1/1970 | Frazier | F16B 43/007 411/532 |
| 4,274,323 A * | 6/1981 | Resnicow | F16B 43/007 411/427 |
| 8,353,648 B2 * | 1/2013 | Bucknell | F16B 31/04 411/14.5 |

* cited by examiner

*Primary Examiner* — Jake Cook
(74) *Attorney, Agent, or Firm* — Harrity & Harrity LLP

(57) ABSTRACT

A snap ring assembly includes a base set. The base set includes a first base section and a second base section. The first base section is adapted to be disposed adjacent and substantially coplanar with respect to the second base section. The snap ring assembly also includes a retaining set. The retaining set includes a first retaining section and a second retaining section. The first retaining section is adapted to be disposed adjacent and substantially coplanar with respect to the second retaining section. Each of the first retaining section and the second retaining section is adapted to be removably coupled to each of the first base section and the second base section.

20 Claims, 9 Drawing Sheets

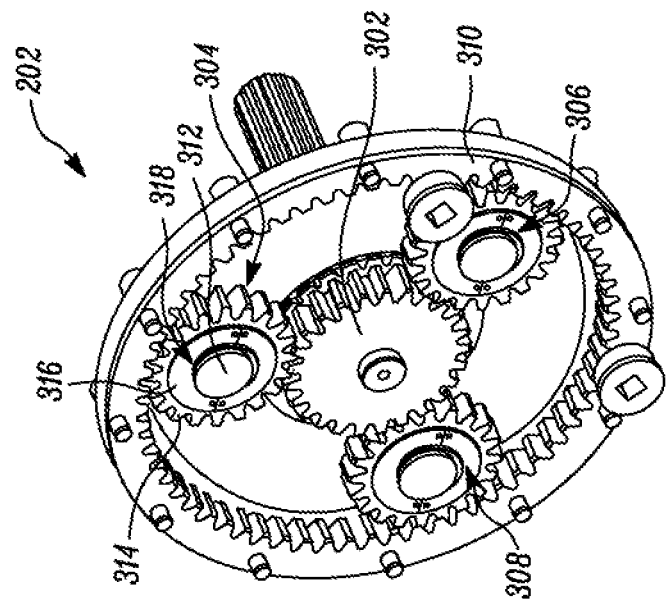
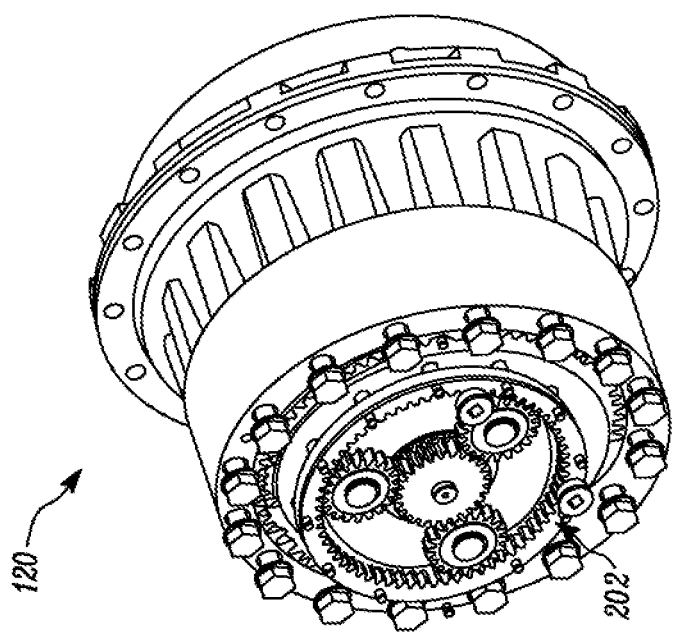
FIG. 3
FIG. 2

SNAP RING ASSEMBLY

TECHNICAL FIELD

The present disclosure relates to a snap ring assembly. More particularly, the present disclosure relates to the snap ring assembly for a gear assembly.

BACKGROUND

A tracked machine, such as a hydraulic excavator, employs a final drive in order to transfer mechanical power from a portion of a transmission system to a track of the machine. The final drive may include one or more gears rotatably mounted on one or more shafts respectively. Generally, the gear may be retained on the respective shaft by using a thrust washer and a snap ring.

Generally, a thickness of the snap ring may be substantially lesser than that of the thrust washer. Also, a width of the snap ring may be substantially lesser than that of the thrust washer. As a result, a thrust loading condition within the final drive may result in increased contact stress between the thrust washer and the snap ring. Also, in a harsh working condition, such as an extended operation in a wet and/or corrosive environment, water may enter the final drive and may result in accelerated wear of the thrust washer and/or the snap ring.

The increased contact stress may result in deformation of the snap ring, accelerated wear of the snap ring and/or the thrust washer, and, in many situations, a structural failure of the snap ring. This may, in turn, lead to increased movement of the gear and/or the thrust washer with respect to the shaft resulting in premature failure of the final drive. Hence, there is a need for an improved snap ring assembly for such applications.

U.S. Pat. No. 2,999,412 describes a self-locking two piece fastening device. The two pieces are adapted to be inserted radially into a peripheral groove in a shaft from opposite sides thereof and snapped into locking engagement with each other in cooperative relationship with the groove.

SUMMARY OF THE DISCLOSURE

In an aspect of the present disclosure, a snap ring assembly is provided. The snap ring assembly includes a base set. The base set includes a first base section and a second base section. The first base section is adapted to be disposed adjacent and substantially coplanar with respect to the second base section. The snap ring assembly also includes a retaining set. The retaining set includes a first retaining section and a second retaining section. The first retaining section is adapted to be disposed adjacent and substantially coplanar with respect to the second retaining section. Each of the first retaining section and the second retaining section is adapted to be removably coupled to each of the first base section and the second base section.

In another aspect of the present disclosure, a gear assembly is provided. The gear assembly includes a shaft member and a gear element rotatably mounted on the shaft member. The gear assembly also includes a snap ring assembly removably coupled to the shaft member and disposed adjacent to the gear element. The snap ring assembly includes a base set. The base set includes a first base section and a second base section. The first base section is adapted to be disposed adjacent and substantially coplanar with respect to the second base section. Each of the first base section and the second base section is adapted to contact the shaft member. The snap ring assembly also includes a retaining set. The retaining set includes a first retaining section and a second retaining section. The first retaining section is adapted to be disposed adjacent and substantially coplanar with respect to the second retaining section. Each of the first retaining section and the second retaining section is adapted to be removably coupled to each of the first base section and the second base section.

In yet another aspect of the present disclosure, a drive assembly is provided. The drive assembly includes a gear assembly. The gear assembly includes a shaft member and a gear element rotatably mounted on the shaft member. The gear assembly also includes a thrush washer removably mounted on the shaft member and disposed adjacent to the gear element. The gear assembly further includes a snap ring assembly removably coupled to the shaft member and disposed adjacent to the thrush washer. The snap ring assembly includes a base set. The base set includes a first base section and a second base section. The first base section is adapted to be disposed adjacent and substantially coplanar with respect to the second base section. Each of the first base section and the second base section is adapted to contact the shaft member. The snap ring assembly also includes a retaining set. The retaining set includes a first retaining section and a second retaining section. The first retaining section is adapted to be disposed adjacent and substantially coplanar with respect to the second retaining section. Each of the first retaining section and the second retaining section is adapted to be removably coupled to each of the first base section and the second base section.

Other features and aspects of this disclosure will be apparent from the following description and the accompanying drawings.

BRIEF DESCRIPTION OF THE DRAWINGS

FIG. 2 is a perspective view of a drive assembly associated with the machine of FIG. 1, according to an embodiment of the present disclosure:

FIG. 3 is a perspective view of a planetary gear train associated with the drive assembly of FIG. 2, according to an embodiment of the present disclosure;

DETAILED DESCRIPTION

Figure 1:
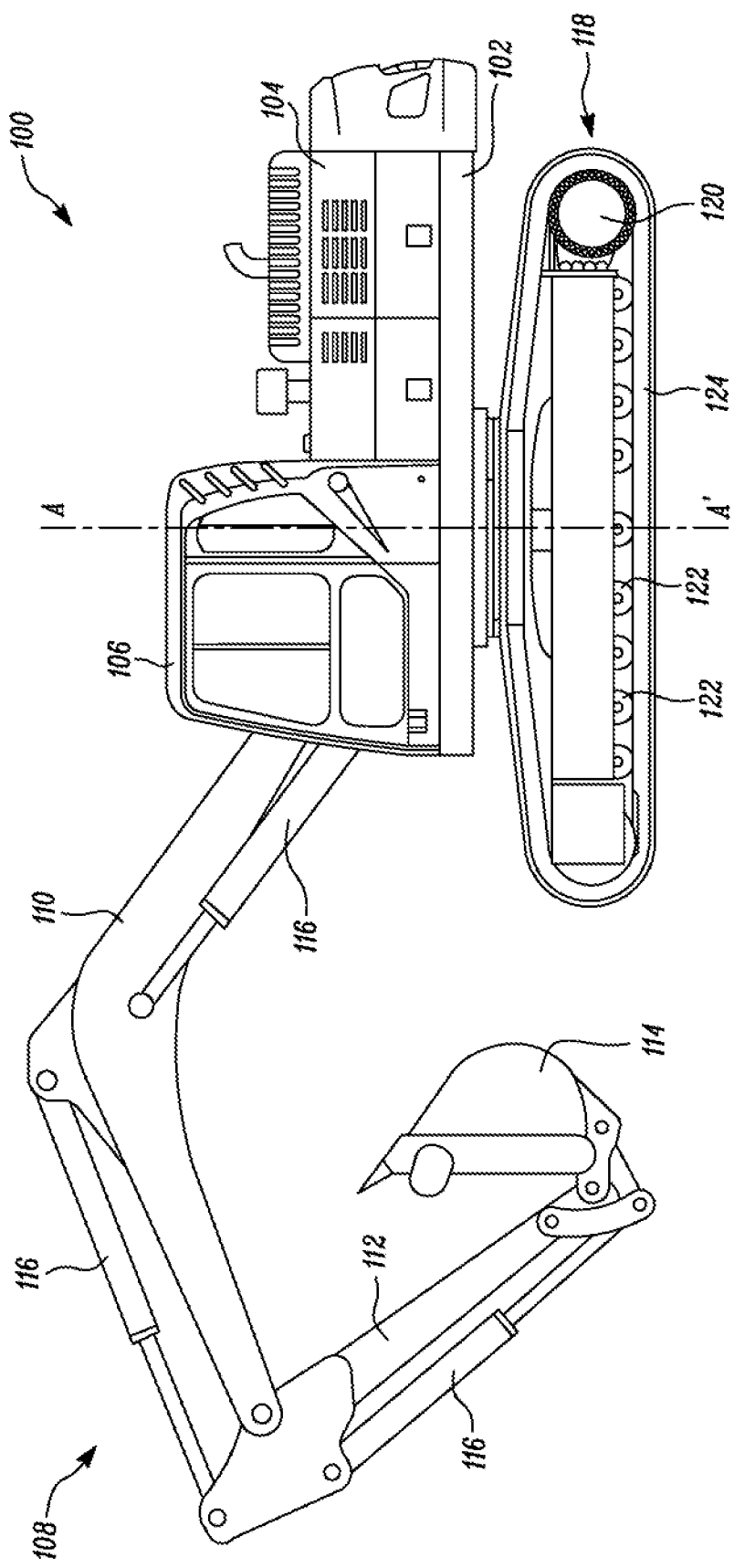
FIG. 1 is a side view of an exemplary machine, according to an embodiment of the present disclosure.

Wherever possible, the same reference numbers will be used throughout the drawings to refer to the same or the like parts. Referring to FIG. 1, an exemplary machine 100 is illustrated. More specifically, the machine 100 is a hydraulic excavator. In other embodiments, the machine 100 may be any other tracked machine, such as a track type tractor, a tracked loader, a mining shovel, a rope shovel, and the like. The machine 100 may be employed in any industry including, but not limited to, construction, agriculture, mining, transportation, material handling, waste management, and forestry.

The machine 100 includes a frame 102. The frame 102 is adapted to support various components of the machine 100 thereon. The machine 100 includes an enclosure 104 mounted on the frame 102. The enclosure 104 is adapted to enclose a power source (not shown) therein. The power source may be any power source known in the art, such as an internal combustion engine, batteries, motor, and the like. The power source is adapted to provide power to the machine 100 for operational and mobility requirements.

The machine 100 includes an operator cabin 106 mounted on the frame 102. The operator cabin 106 includes one or more controls, such as joysticks, pedals, levers, buttons, switches, knobs, audio visual devices, operator consoles, a steering wheel, and the like. The controls are adapted to enable an operator to control the machine 100 on ground.

The machine 100 also includes a linkage assembly 108 movably mounted to the frame 102. The linkage assembly 108 includes a boom 110 movably mounted to the frame 102, an arm 112 movably mounted to the boom 110, and an implement 114 movably mounted to the arm 112. The linkage assembly 108 also includes one or more hydraulic actuators 116 in order to provide movement to the linkage assembly 108 around the machine 100 during an operation thereof.

The machine 100 further includes an undercarriage 118 rotatably mounted to the frame 102. The undercarriage 118 is adapted to support the frame 102 on the ground. The undercarriage 118 is also adapted to rotate about a vertical axis A-A' with respect to the frame 102. Accordingly, the undercarriage 118 is adapted to provide maneuverability to the machine 100 on the ground. The undercarriage 118 includes a drive assembly 120 and a set of rollers 122, such as one or more driven rollers, one or more idlers, and the like. The undercarriage 118 also includes a track 124 mounted on the drive assembly 120 and the set of rollers 122. Each of the drive assembly 120, the set of rollers 122, and the track 124 is adapted to provide mobility to the machine 100 on the ground.

Referring to FIG. 2, a perspective view of the drive assembly 120 is illustrated. The drive assembly 120 is adapted to transfer mechanical power from a portion of a transmission system (not shown) to the track 124. The drive assembly 120 includes a planetary gear train 202 movably mounted therein. The planetary gear train 202 will be hereinafter interchangeably referred to as "the gear train 202".

Referring to FIG. 3, a perspective view of the gear train 202 is illustrated. The gear train 202 includes a sun gear 302, and one or more gear assemblies 304, 306, 308 operably coupled to the sun gear 302. In the illustrated embodiment, the gear train 202 includes three gear assemblies 304, 306, 308. In other embodiments, the gear train 202 may include a single or multiple gear assemblies, based on application requirements. The gear train 202 also includes a ring gear 310 operably coupled to each of the gear assemblies 304, 306, 308.

The gear assemblies 304, 306, 308 will now be explained with reference to a single gear assembly 304 and it should be noted that each of the gear assemblies 306, 308 may have a similar configuration to that of the gear assembly 304. The gear assembly 304 includes a shaft member 312 fixedly coupled to the drive assembly 120. The gear assembly 304 includes a gear element 314 rotatably mounted on the shaft member 312. The gear element 314 is adapted to be operably coupled to the sun gear 302 and the ring gear 310. Additionally, or optionally, the gear assembly 304 also includes a thrust washer 316 mounted on the shaft member 312. In such a situation, the thrust washer 316 is disposed adjacent to the gear element 314.

The gear assembly 304 further includes a snap ring assembly 318 removably coupled to the shaft member 312. The snap ring assembly 318 is disposed adjacent to the thrust washer 316. The snap ring assembly 318 is adapted to retain the thrust washer 316 and the gear element 314 on the shaft member 312. In some embodiments, the thrust washer 316 may be omitted. In such a situation, the snap ring assembly 318 may be disposed adjacent to the gear element 314.

Figure 4:
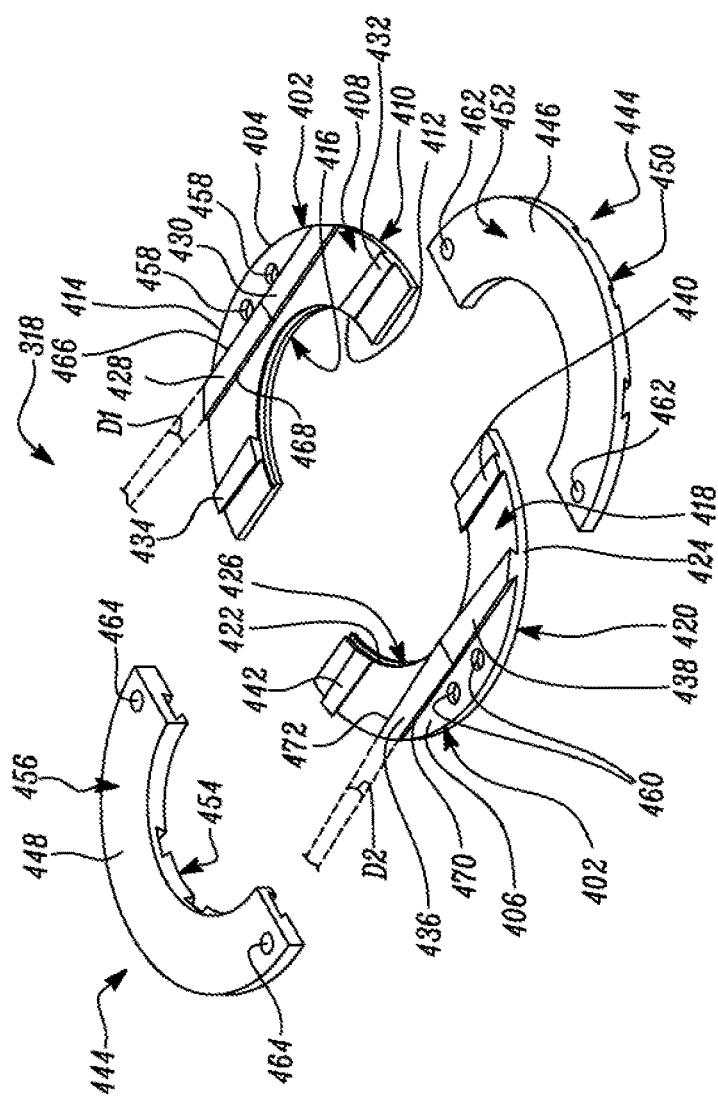
FIG. 4 is an exploded perspective view of a snap ring assembly, according to an embodiment of the present disclosure.

Referring to FIG. 4, the snap ring assembly 318 includes a base set 402. The base set 402 includes a first base section 404 and a second base section 406. Each of the first base section 404 and the second base section 406 includes a semicircular configuration. Accordingly, the first base section 404 includes a first base surface 408 and a second base surface 410 disposed opposite the first base surface 408. Also, the first base section 404 includes a first inner periphery 412 and a first outer periphery 414 disposed opposite the first inner periphery 412. The first inner periphery 412 includes a first stepped portion 416 provided thereon.

Similarly, the second base section 406 includes a third base surface 418 and a fourth base surface 420 disposed opposite the third base surface 418. Also, the second base section 406 includes a second inner periphery 422 and a second outer periphery 424 disposed opposite the second inner periphery 422. The second inner periphery 422 includes a second stepped portion 426 provided thereon. The second base section 406 is adapted to be disposed adjacent and substantially coplanar with respect to the first base section 404 forming a substantially ring-shaped configuration of the base set 402.

The first base section 404 includes a plurality of first raised portions 428, 430, 432, 434 provided on the first base surface 408. In the illustrated embodiment, the plurality of first raised portions 428, 430, 432, 434 includes four first raised portions 428, 430, 432, 434. In other embodiments, the first base section 404 may include single or multiple first raised portions, based on application requirements.

The first raised portion 428 is linearly aligned with respect to the first raised portion 430 and aligned substantially parallel and spaced apart with respect to the first raised portions 432, 434. Also, the first raised portion 432 is linearly aligned with respect to the first raised portion 434 and aligned substantially parallel and spaced apart with respect to the first raised portions 428, 430. In other embodiments, each of the plurality of first raised portions 428, 430, 432, 434 may be arranged in any configuration with respect to one another on the first base surface 408.

Each of the plurality of first raised portions 428, 430, 432, 434 includes a substantially tapered cross-sectional configuration. More specifically, in the illustrated embodiment, each of the plurality of first raised portions 428, 430, 432, 434 includes a substantially dovetail-shaped configuration. In other embodiments, one or more of the plurality of first raised portions 428, 430, 432, 434 may include any other cross-sectional configuration, such as trapezoidal, rectangular, tapered, straight, and the like.

Also, each of the plurality of first raised portions 428, 430, 432, 434 includes a substantially tapered longitudinal configuration. More specifically, in the illustrated embodiment, each of the plurality of first raised portions 428, 430, 432, 434 includes a drafted longitudinal configuration defining a first draft angle "D1". More specifically, the first draft angle "D1" is defined between corresponding side edges 466, 468 of each of the plurality of first raised portions 428, 430, 432, 434 respectively. In other embodiments, one or more of the plurality of first raised portions 428, 430, 432, 434 may include varying values of the first draft angle "D1". In yet other embodiments, one or more of the first raised portions 428, 430, 432, 434 may include any other longitudinal configuration, such as triangular, rectangular, tapered, straight, and the like.

The second base section 406 also includes a plurality of second raised portions 436, 438, 440, 442 provided on the third base surface 418. In the illustrated embodiment, the plurality of second raised portions 436, 438, 440, 442 includes four second raised portions 436, 438, 440, 442. In other embodiments, the second base section 406 may include single or multiple second raised portions, based on application requirements.

The second raised portion 436 is linearly aligned with respect to the second raised portion 438 and aligned substantially parallel and spaced apart with respect to the second raised portions 440, 442. Also, the second raised portion 440 is linearly aligned with respect to the second raised portion 442 and aligned substantially parallel and spaced apart with respect to the second raised portions 436, 438. In other embodiments, each of the plurality of second raised portions 436, 438, 440, 442 may be arranged in any configuration with respect to one another on the second base surface 410.

Each of the plurality of second raised portions 436, 438, 440, 442 includes a substantially tapered cross-sectional configuration. More specifically, in the illustrated embodiment, each of the plurality of second raised portions 436, 438, 440, 442 includes a substantially dovetail-shaped configuration. In other embodiments, one or more of the plurality of second raised portions 436, 438, 440, 442 may include any other cross-sectional configuration, such as trapezoidal, rectangular, tapered, straight, and the like.

Also, each of the plurality of second raised portions 436, 438, 440, 442 includes a substantially tapered longitudinal configuration. More specifically, in the illustrated embodiment, each of the plurality of second raised portions 436, 438, 440, 442 includes a drafted longitudinal configuration defining a second draft angle "D2". More specifically, the second draft angle "D2" is defined between corresponding side edges 470, 472 of each of the plurality of second raised portions 436, 438, 440, 442 respectively. In other embodiments, one or more of the plurality of second raised portions 436, 438, 440, 442 may include varying values of the second draft angle "D2". In yet other embodiments, one or more of the plurality of second raised portions 436, 438, 440, 442 may include any other longitudinal configuration, such as triangular, rectangular, tapered, straight, and the like. Also, in other embodiments, the second draft angle "D2" may be different with respect to the first draft angle "D1". In yet other embodiments, the second draft angle "D2" may be equal to the first draft angle "D".

The snap ring assembly 318 also includes a retaining set 444. The retaining set 444 includes a first retaining section 446 and a second retaining section 448. Each of the first retaining section 446 and the second retaining section 448 includes a semicircular configuration. The first retaining section 446 includes a first retaining surface 450 and a second retaining surface 452 disposed opposite the first retaining surface 450. Similarly, the second retaining section 448 includes a third retaining surface 454 and a fourth retaining surface 456 disposed opposite the third retaining surface 454. The second retaining section 448 is adapted to be disposed adjacent and substantially coplanar with respect to the first retaining section 446 forming a substantially ring-shaped configuration of the retaining set 444.

Figure 5:
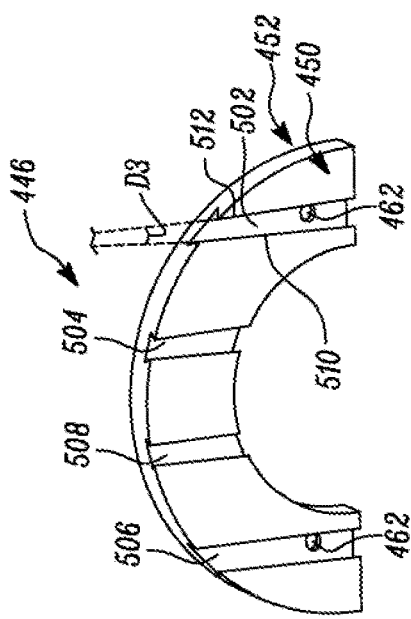
FIG. 5 is an inverted perspective view of a portion of the snap ring assembly of FIG. 4, according to an embodiment of the present disclosure.

Referring to FIG. 5, the first retaining section 446 includes a plurality of first groove portions 502, 504, 506, 508 provided on the first retaining surface 450. In the illustrated embodiment, the plurality of first groove portions 502, 504, 506, 508 includes four first groove portions 502, 504, 506, 508. Each of the plurality of first groove portions 502, 504 is provided in association with each of the plurality of first raised portions 430, 432 respectively. Also, each of the plurality of first groove portions 506, 508 is provided in association with each of the plurality of second raised portions 438, 440 respectively.

Each of the plurality of first groove portions 502, 504 is adapted to interlock with respect to each of the plurality of first raised portions 430, 432 respectively. Also, each of the plurality of first groove portions 506, 508 is adapted to interlock with respect to each of the plurality of second raised portions 438, 440 respectively. In other embodiments, the first retaining section 446 may include single or multiple first groove portions based on number of the plurality of first raised portions and the plurality of second raised portions.

Each of the plurality of first groove portions 502, 504, 506, 508 includes a substantially tapered cross-sectional configuration. More specifically, in the illustrated embodiment, each of the plurality of first groove portions 502, 504, 506, 508 includes a substantially dovetail-shaped configuration. In other embodiments, one or more of the plurality of first groove portions 502, 504, 506, 508 may include any other cross-sectional configuration, such as trapezoidal, rectangular, tapered, straight, and the like, based on the cross-sectional configuration of the plurality of first raised portions 430, 432 and the plurality of second raised portions 438, 440 respectively.

Also, each of the plurality of first groove portions 502, 504, 506, 508 includes a substantially tapered longitudinal configuration. More specifically, in the illustrated embodiment, each of the plurality of first groove portions 502, 504, 506, 508 includes a drafted longitudinal configuration defining a third draft angle "D3". More specifically, the third draft angle "D3" is defined between corresponding side edges 510, 512 of each of the plurality of first groove portions 502, 504, 506, 508 respectively. In other embodiments, each of the plurality of first groove portions 502, 504, 506, 508 may include varying values of the third draft angle "D3".

Also, the third draft angle "D3" of each of the plurality of first groove portions 502, 504, 506, 508 is equal to the first draft angle "D1" of each of the plurality of first raised portions 430, 432 and the second draft angle "D2" of each of the plurality of second raised portion 438, 440 respectively. In yet other embodiments, one or more of the plurality of first groove portions 502, 504, 506, 508 may include any other longitudinal configuration, such as triangular, rectangular, tapered, straight, and the like, based on the longitudinal configuration of the plurality of first raised portions 430, 432 and the plurality of second raised portions 438, 440 respectively.

Figure 6:
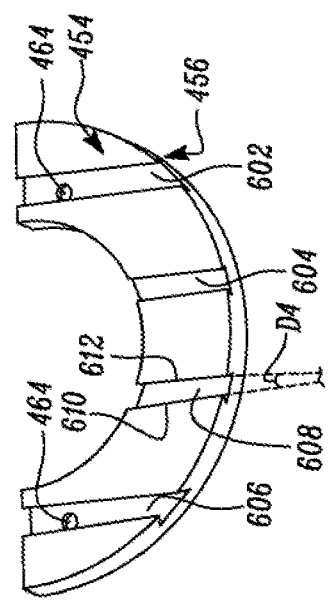
FIG. 6 is an inverted perspective view of another portion of the snap ring assembly of FIG. 4, according to an embodiment of the present disclosure.

Referring to FIG. 6, the second retaining section 448 includes a plurality of second groove portions 602, 604, 606, 608 provided on the third retaining surface 454. In the illustrated embodiment, the plurality of second groove portions 602, 604, 606, 608 includes four second groove portions 602, 604, 606, 608. Each of the plurality of second groove portions 602, 604 is provided in association with each of the plurality of first raised portions 428, 434 respectively. Also, the plurality of second groove portions 606, 608 are provided in association with the plurality of second raised portions 436, 442 respectively.

Each of the plurality of second groove portions 602, 604 is adapted to interlock with respect to each of the plurality of first raised portions 428, 434 respectively. Also, each of the plurality of second groove portions 606, 608 is adapted to interlock with respect to each of the plurality of second raised portions 436, 442 respectively. In other embodiments, the second retaining section 448 may include single or multiple second groove portions based on number of the plurality of first raised portions and the plurality of second raised portions.

Each of the plurality of second groove portions 602, 604, 606, 608 includes a substantially tapered cross-sectional configuration. More specifically, in the illustrated embodiment, each of the plurality of second groove portions 602, 604, 606, 608 includes a substantially dovetail-shaped configuration. In other embodiments, one or more of the plurality of second groove portions 602, 604, 606, 608 may include any other cross-sectional configuration, such as trapezoidal, rectangular, tapered, straight, and the like, based on the cross-sectional configuration of the plurality of first raised portions 428, 434 and the plurality of second raised portions 436, 442 respectively.

Also, each of the plurality of second groove portions 602, 604, 606, 608 includes a substantially tapered longitudinal configuration. More specifically, in the illustrated embodiment, each of the plurality of second groove portions 602, 604, 606, 608 includes a drafted longitudinal configuration defining a fourth draft angle "D4". More specifically, the fourth draft angle "D4" is defined between corresponding side edges 610, 612 of each of the plurality of second groove portions 602, 604, 606, 608 respectively. In other embodiments, each of the plurality of second groove portions 602, 604, 606, 608 may include varying values of the fourth draft angle "D4".

Also, the fourth draft angle "D4" of each of the plurality of second groove portions 602, 604, 606, 608 is equal to the first draft angle "D1" of each of the plurality of first raised portions 428, 434 and the second draft angle "D2" of each of the plurality of second raised portions 436, 442 respectively. In yet other embodiments, one or more of the plurality of second groove portions 602, 604, 606, 608 may include any other longitudinal configuration, such as triangular, rectangular, tapered, straight, and the like, based on the longitudinal configuration of each of the plurality of first raised portions 428, 434 and each of the plurality of second raised portions 436, 442 respectively.

It should be noted that location of the plurality of first raised portions 428, 430, 432, 434, the plurality of second raised portions 436, 438, 440, 442, the plurality of first groove portions 502, 504, 506, 508, and the plurality of second groove portions 602, 604, 606, 608 provided on the first base section 404, the second base section 406, the first retaining section 446, and the second retaining section 448 respectively is merely exemplary and, in other embodiments, may be interchanged in any combination, based on application requirements. For example, in some embodiments, the plurality of first raised portions 428, 430, 432, 434 may be provided on the first retaining section 446, the plurality of second raised portions 436, 438, 440, 442 may be provided on the second retaining section 448, the plurality of first groove portions 502, 504, 506, 508 may be provided on the first base section 404, and the plurality of second groove portions 602, 604, 606, 608 may be provided on the second base section 406 respectively.

In yet other embodiments, one or more of the plurality of first raised portions 428, 430, 432, 434 may be provided on the first base section 404 and a remaining of the plurality of first raised portions 428, 430, 432, 434 may be provided on the first retaining section 446. Accordingly, one or more of the plurality of first groove portions 502, 504, 506, 508 may be provided on the first retaining section 446 and a remaining of the plurality of first groove portions 502, 504, 506, 508 may be provided on the first base section 404 respectively. Also, one or more of the plurality of second raised portions 436, 438, 440, 442 may be provided on the second base section 406 and a remaining of the plurality of second raised portions 436, 438, 440, 442 may be provided on the second retaining section 448. Accordingly, one or more of the plurality of second groove portions 602, 604, 606, 608 may be provided on the second retaining section 448 and a remaining of the plurality of second groove portions 602, 604, 606, 608 may be provided on the second base section 406 respectively.

Figure 7:
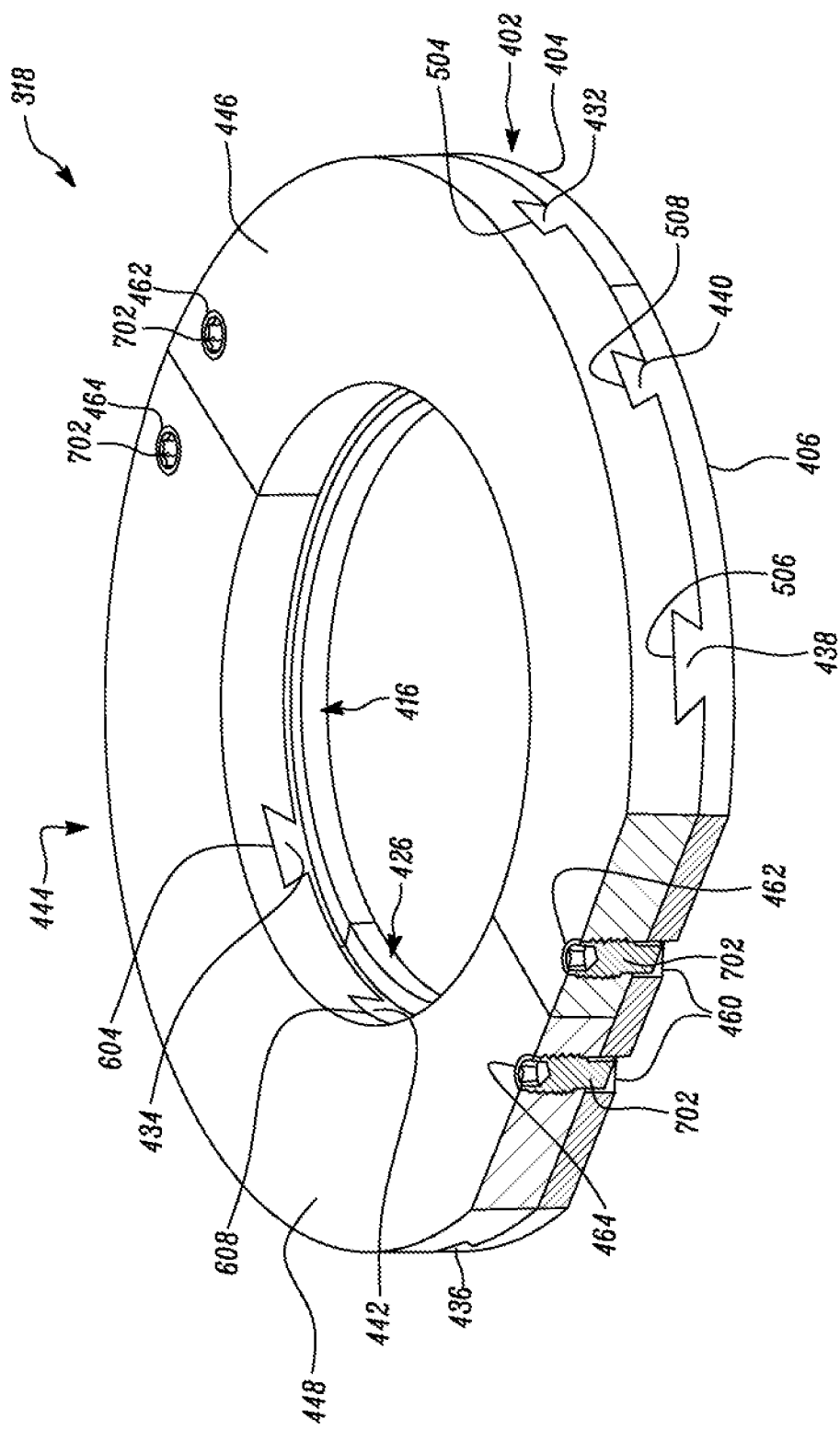
FIG. 7 is a partial perspective cross-sectional view of the snap ring assembly of FIG. 4 in an assembled position, according to an embodiment of the present disclosure.

Referring to FIG. 7, in an assembled position, the base set 402 is coupled to the retaining set 444. More specifically, the first retaining section 446 is coupled to the first base section 404 and the second base section 406 such that each the plurality of first groove portions 502, 504, 506, 508 is slidably interlocked with each of the plurality of first raised portions 430, 432 and each of the plurality of second raised portions 438, 440 respectively. Also, the second retaining section 448 is coupled to the first base section 404 and the second base section 406 such that each of the plurality of second groove portions 602, 604, 606, 608 is slidably interlocked with each of the plurality of first raised portions 428, 434 and each of the plurality of second raised portions 436, 442 respectively.

Further, as shown in FIGS. 4, 5, 6, and 7, each of the first base section 404 and the second base section 406 includes one or more base bores 458, 460 provided therein respectively. Also, each of the first retaining section 446 and the second retaining section 448 includes one or more retaining bores 462, 464 provided therein respectively. It should be noted that location of the base bores 458, 460 and the retaining bores 462, 464 on each of the first base section 404, the second base section 406, the first retaining section 446, and the second retaining section 448 respectively is merely exemplary and may vary based on application requirements.

In the assembled position, as shown in FIG. 7, each of the base bores 458, 460 is aligned with respect to each of the retaining bores 462, 464 in order to receive fasteners 702 therein. The fasteners 702 are adapted to removably couple each of the first retaining section 446 and the second retaining section 448 with the first base section 404 and the second base section 406 respectively. The fasteners 702 may be any known fastening elements known in the art, such as screws, plugs, pins, rivets, and the like.

Figure 9:
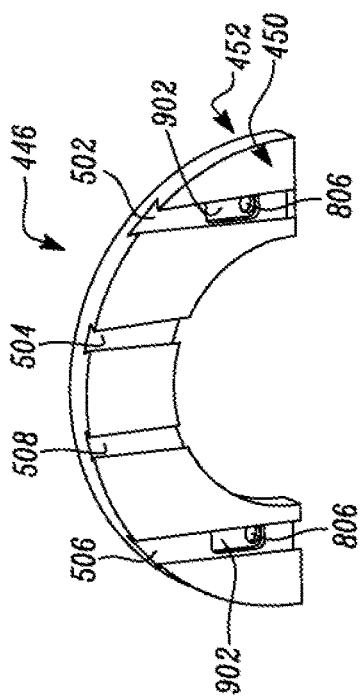
FIG. 9 is an inverted perspective view of a portion of the snap ring assembly of FIG. 8, according to another embodiment of the present disclosure.
Figure 10:
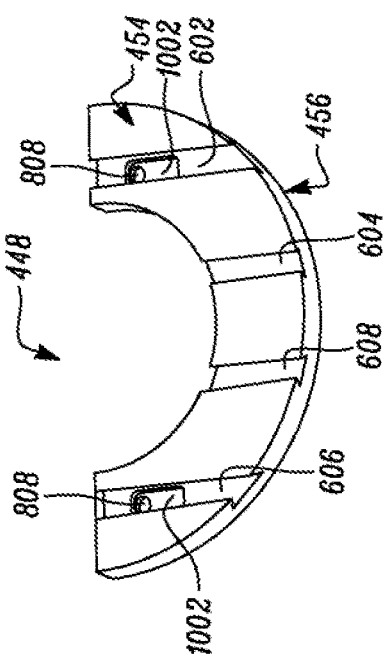
FIG. 10 is an inverted perspective view of another portion of the snap ring assembly of FIG. 8, according to another embodiment of the present disclosure.
Figure 8:
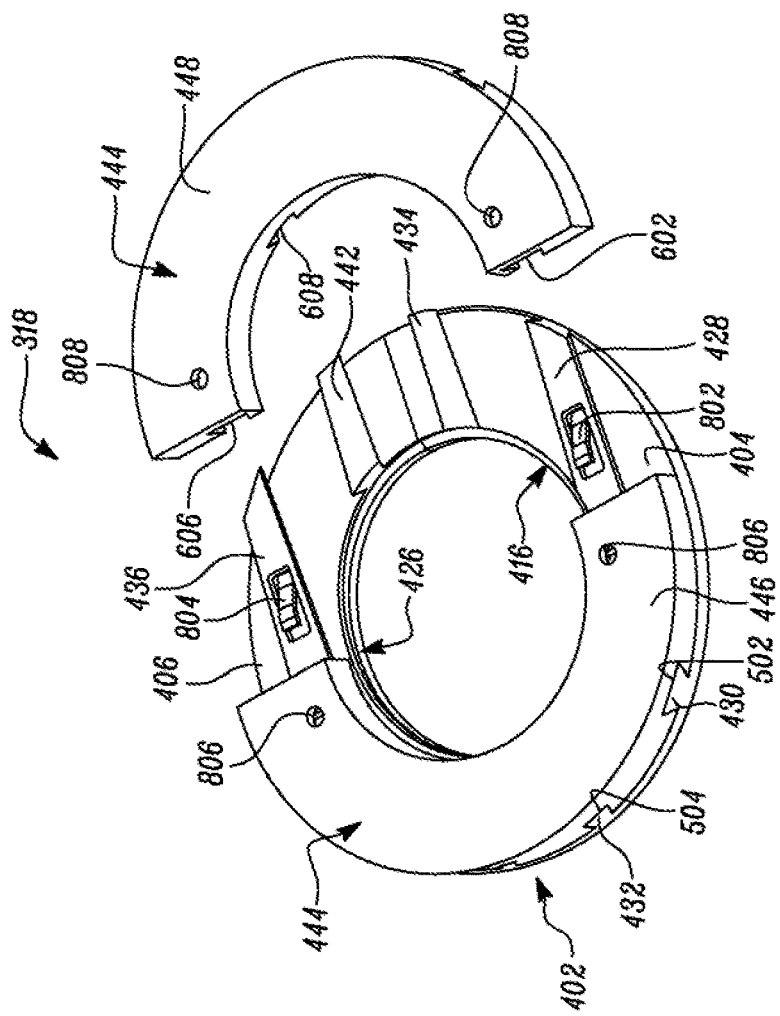
FIG. 8 is an exploded perspective view of a snap ring assembly, according to another embodiment of the present disclosure.

In another embodiment, referring to FIGS. 8, 9, and 10, the base set 402 may be coupled to the retaining set 444 using one or more snapping detents 802, 804. More specifically, the snapping detents 802, 804 are provided on each of the first base section 404 and the second base section 406 respectively. Also, one or more retaining recesses 902, 1002 are provided on each of the first retaining section 446 and the second retaining section 448 in association with the snapping detents 802, 804 respectively.

Figure 11:
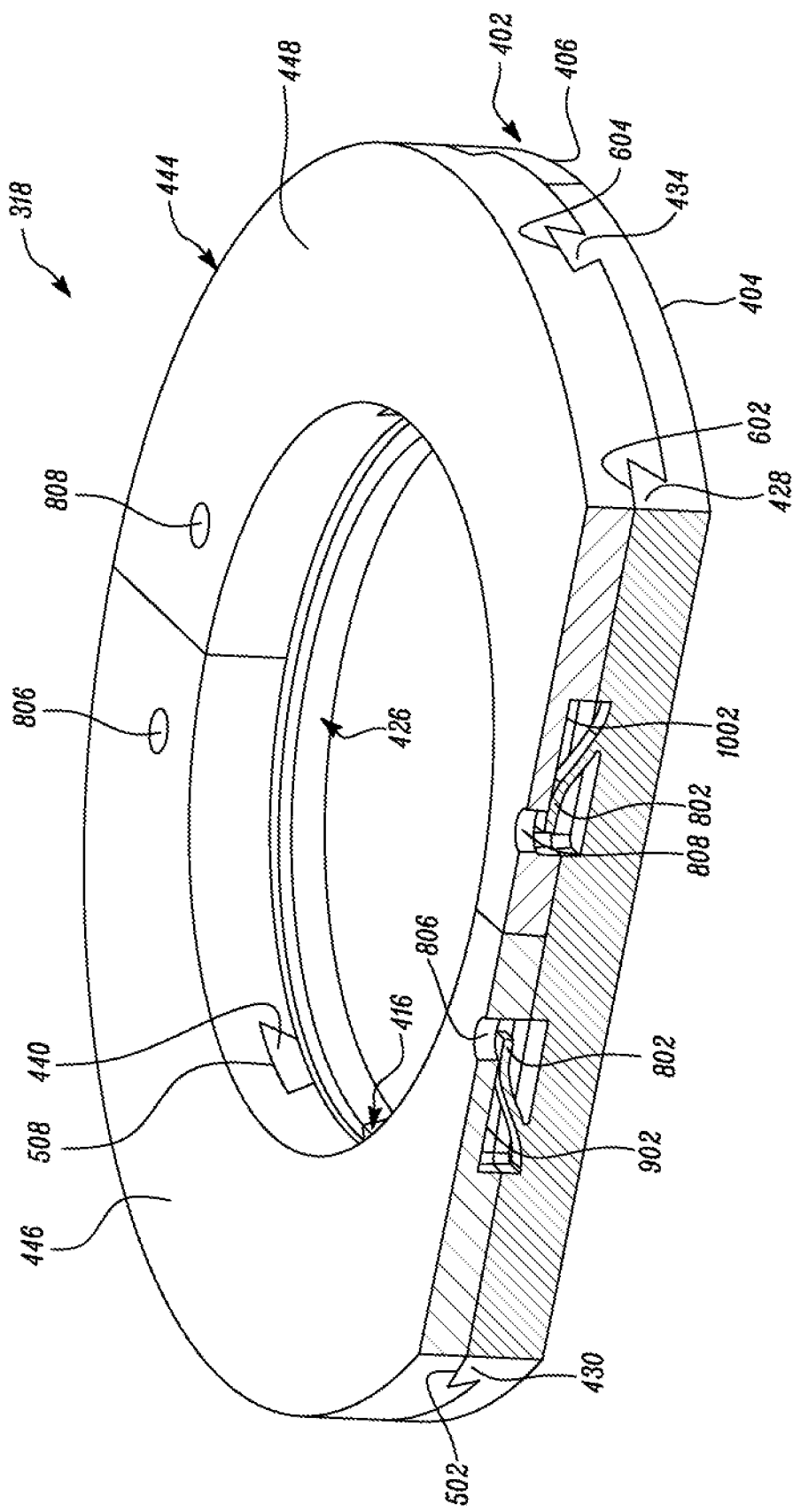
FIG. 11 is a partial perspective cross-sectional view of the snap ring assembly of FIG. 8 in an assembled position, according to another embodiment of the present disclosure.

Referring to FIG. 11, in an assembled position, each of the snapping detents 802 of the first base section 404 is received in each of the retaining recesses 902, 1002 of the first retaining section 446 and the second retaining section 448 respectively. Also, each of the snapping detents 804 of the second base section 406 is received in each of the retaining recesses 902, 1002 of the first retaining section 446 and the second retaining section 448 respectively (not shown). Further, bores 806, 808 may be provided on each of the first retaining section 446 and the second retaining section 448 in association with each of the retaining recesses 902, 1002 respectively. The bores 806, 808 are adapted to receive a tool in order to disengage the snapping detents 802, 804 from the respective retaining recesses 902, 1002 during disassembly.

It should be noted that location of the snapping detents 802, 804 and the retaining recesses 902, 1002 on each of the first base section 404, the second base section 406, the first retaining section 446, and the second retaining section 448 respectively is merely exemplary, may vary or may be interchanged based on application requirements. For example, in some embodiments, the snapping detents 802 may be provided on the first retaining section 446 and the retaining recesses 902, 1002 may be provided on the first base section 404 and the second base section 406 respectively. Also, the snapping detents 804 may be provided on the second retaining section 448 and the retaining recesses 902, 1002 may be provided on the first base section 404 and the second base section 406 respectively.

Figure 12:
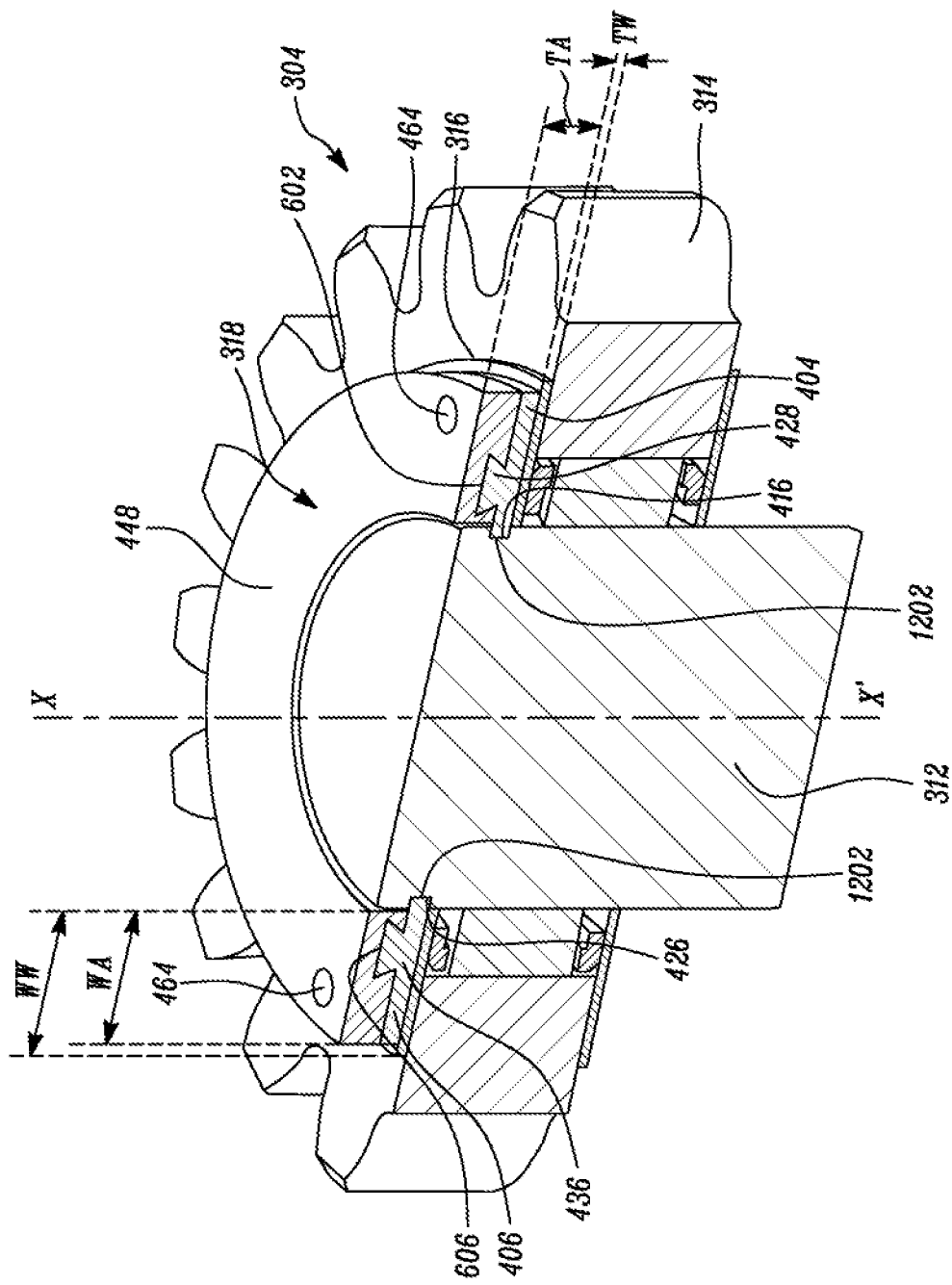
FIG. 12 is a perspective cross-sectional view of a portion of the planetary gear train of FIG. 3 showing the snap ring assembly of FIG. 4 installed thereon, according to an embodiment of the present disclosure.

Referring to FIG. 12, a cross-sectional view of the gear assembly 304 and the snap ring assembly 318 installed on the gear assembly 304 is illustrated. In the assembled position, the first stepped portion 416 provided on the first inner periphery 412 of the first base section 404 is received in a circumferential slot 1202 provided on the shaft member 312. Also, the second stepped portion 426 provided on the second inner periphery 422 of the second base section 406 is received in the circumferential slot 1202 provided on the shaft member 312. Further, as the retaining set 444 is coupled to the base set 402, the snap ring assembly 318 is fixedly held in position around the shaft member 312. Accordingly, in the assembled position, the snap ring assembly 318 limits axial movement of the thrust washer 316 and/or the gear element 314 along an axis X-X'.

As shown in FIG. 12, a thickness "TA" of the snap ring assembly 318 is substantially higher than a thickness "TW" of the thrust washer 316. Also, a width "WA" of the snap ring assembly 318 is approximately equal to a width "WW" of the thrust washer 316. In some embodiments, the width "WA" of the snap ring assembly 318 may be equal or greater than the width "WW" of the thrust washer 316. During a thrust loading condition on the gear assembly 304 and the snap ring assembly 318 along the axis X-X', the snap ring assembly 318 provides an increased surface area for reducing contact stress between the snap ring assembly 318 and the thrust washer 316 and also increased stiffness to limit deformation of the snap ring assembly 318.

The snap ring assembly 318, including the first base section 404, the second base section 406, the first retaining section 446, and the second retaining section 448 may be made using any material known in the art, such as a polymer, a metal or alloy such as maraging steel, and the like. Also, the snap ring assembly 318 may be manufactured using casting, fabrication, forging, machining, additive manufacturing such as three-dimensional (3D) printing, and the like. Further, the snap ring assembly 318 may be treated using sand blasting, heat treatment, and the like.

INDUSTRIAL APPLICABILITY

The disclosed assembly 318 may be manufactured using techniques such as, for example, casting or molding. Alternatively, the disclosed assembly 318 may be manufactured using techniques generally referred to as additive manufacturing or additive fabrication. Known additive manufacturing/fabrication processes include techniques such as, for example, 3D printing. 3D printing is a process wherein material may be deposited in successive layers under the control of a computer.

The computer controls additive fabrication equipment to deposit the successive layers according to a three-dimensional (3D) model (e.g., a digital file such as an Additive Manufacturing File (AMF) format or Stereo Lithography (STL) format) that is configured to be converted into a plurality of slices, for example substantially two-dimensional (2D) slices, that each define a cross-sectional layer of the snap ring assembly 318 in order to manufacture, or fabricate, the snap ring assembly 318. In one case, the disclosed assembly 318 would be an original component and the 3D printing process would be utilized to manufacture the snap ring assembly 318. In other cases, the 3D process could be used to replicate an existing assembly 318 and the replicated assembly 318 could be sold as aftermarket parts. This replicated aftermarket assembly 318 could be either exact copies of the original assembly 318 or pseudo copies differing in only non-critical aspects.

Figure 13:
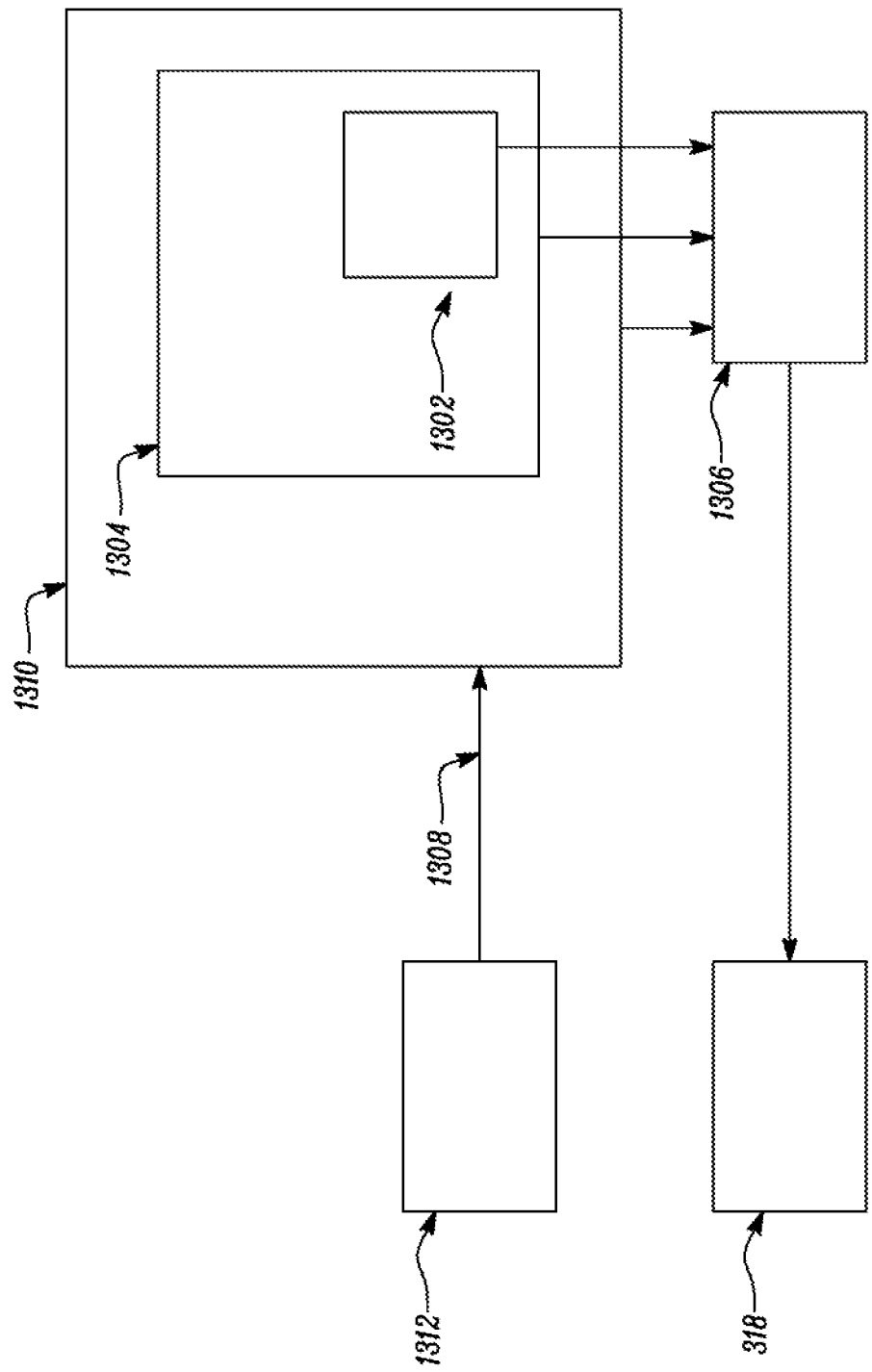
FIG. 13 is a schematic drawing representing a system for generating a three-dimensional (3D) model of the snap ring assembly of FIGS. 4 and 8, according to an embodiment of the present disclosure.

With reference to FIG. 13, a 3D model 1302 used to represent an original assembly 318 may be on a computer-readable storage medium 1304 such as, for example, magnetic storage including floppy disk, hard disk, or magnetic tape; semiconductor storage such as solid-state disk (SSD) or flash memory; optical disc storage; magneto-optical disc storage; or any other type of physical memory on which information or data readable by at least one processor may be stored.

This storage medium may be used in connection with commercially available 3D printers 1306 to manufacture, or fabricate, the snap ring assembly 318. Alternatively, the 3D model 1302 may be transmitted electronically to the 3D printer 1306 in a streaming fashion without being permanently stored at the location of the 3D printer 1306. In either case, the 3D model 1302 constitutes a digital representation of the snap ring assembly 318 suitable for use in manufacturing the snap ring assembly 318.

Figure 14:
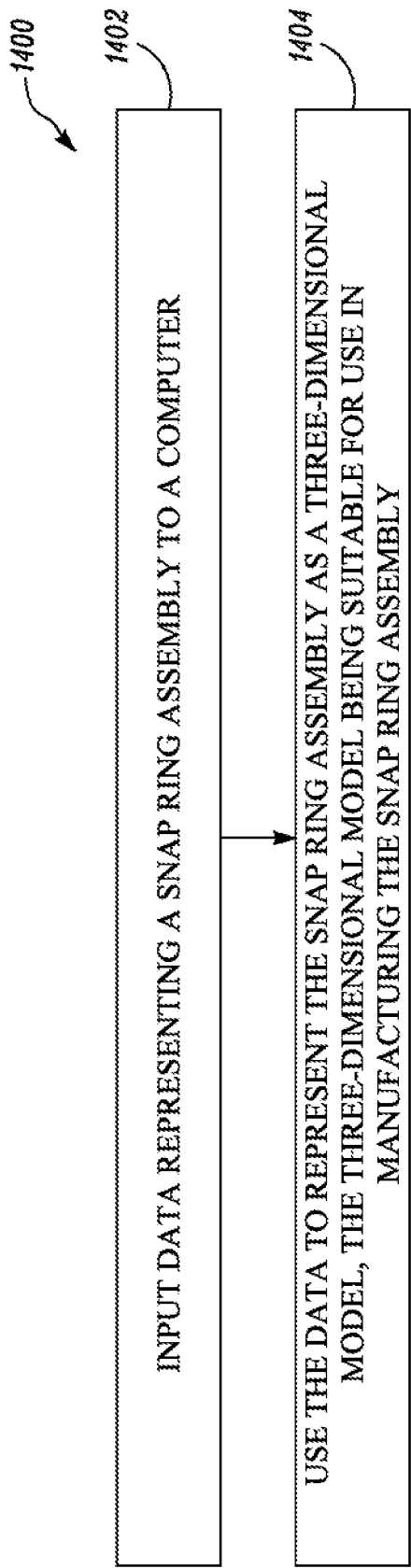
FIG. 14 is a flowchart illustrating a method of creating a computer-readable 3D model suitable for use in manufacturing the snap ring assembly of FIGS. 4 and 8, according to an embodiment of the present disclosure.

The 3D model 1302 may be formed in a number of known ways. Referring to FIG. 14, a method 1400 of creating a computer-readable 3D model 1302 suitable for use in manufacturing the snap ring assembly 318 is provided. At step 1402, the 3D model 1302 is created by inputting data 1308 representing the snap ring assembly 318 to a computer or a processor 1310 such as a cloud-based software operating system. At step 1404, the data 1308 may then be used as the 3D model 1302 representing the physical assembly 318. The 3D model 1302 is intended to be suitable for the purposes of manufacturing the snap ring assembly 318. In an exemplary embodiment, the 3D model 1302 is suitable for the purpose of manufacturing the snap ring assembly 318 by an additive manufacturing technique.

In one embodiment depicted in FIG. 13, the inputting of data 1308 may be achieved with a 3D scanner 1312. The method 1400 may involve contacting the snap ring assembly 318 via a contacting and data receiving device and receiving data from the contacting in order to generate the 3D model 1302. For example, the 3D scanner 1312 may be a contact-type scanner. The scanned data may be imported into a 3D modeling software program to prepare a digital dataset.

In one embodiment, the contacting may occur via direct physical contact using a coordinate measuring machine that measures the physical structure of the snap ring assembly 318 by contacting a probe with the surfaces of the snap ring assembly 318 in order to generate a 3D model 1302. In other embodiments, the 3D scanner 1312 may be a non-contact type scanner and the method may include directing projected energy (e.g. light or ultrasonic) onto the snap ring assembly 318 to be replicated and receiving the reflected energy. From this reflected energy, a computer would generate the computer-readable 3D model 1302 for use in manufacturing the snap ring assembly 318.

In various embodiments, multiple 2D images can be used to create the 3D model 1302. For example, 2D slices of a 3D object can be combined to create the 3D model 1302. In lieu of a 3D scanner, the inputting of data 1308 may be done using computer-aided design (CAD) software. In this case, the 3D model 1302 may be formed by generating a virtual 3D model of the disclosed assembly 318 using the CAD software. The 3D model 1302 would be generated from the CAD virtual 3D model in order to manufacture the snap ring assembly 318.

The additive manufacturing process utilized to create the disclosed assembly 318 may involve materials such as plastic, rubber, metal, etc. In some embodiments, additional processes may be performed to create a finished product. Such additional processes may include, for example, one or more of cleaning, hardening, heat treatment, material removal, and polishing. Other processes necessary to complete a finished product may be performed in addition to or in lieu of these identified processes.

The snap ring assembly 318 provides a simple, efficient, and cost-effective method for retaining the gear assembly 304 in place during operation thereof. Also, the snap ring assembly 318 provides an increased surface area in order to limit accelerated wear of the thrust washer 316 during the thrust loading condition in relation to a commonly employed snap ring. Further, the snap ring assembly 318 provides increased thickness in order to limit deformation of the snap ring assembly 318 during the thrust loading condition in relation to the commonly employed snap ring. As such, premature damage to the thrust washer 316 and/or the snap ring assembly 318 may be limited, in turn, limiting failure of the gear assembly 304. The snap ring assembly 318 may be retrofitted in any gear assembly 304 or drive assembly 120 with little or no modification to the existing system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A snap ring assembly comprising:
   a base set including a first base section and a second base section,
      the first base section being adapted to be disposed adjacent and substantially coplanar with respect to the second base section, and
      the first base section and the second base section forming a first ring; and
   a retaining set including a first retaining section and a second retaining section,
      the first retaining section and the second retaining section forming a second ring that interlocks with the first ring,
      the first retaining section being adapted to be disposed adjacent and substantially coplanar with respect to the second retaining section, and
      each of the first retaining section and the second retaining section being adapted to be removably coupled to each of the first base section and the second base section.

2. The snap ring assembly of claim 1, wherein:
   one of the first base section or the first retaining section includes at least one raised portion provided thereon, and
   another one of the first retaining section or the first base section includes at least one groove portion provided thereon in association with the at least one raised portion respectively,
      the at least one raised portion being adapted to interlock with respect to the at least one groove portion.

3. The snap ring assembly of claim 2, wherein:
   one of the second base section or the second retaining section includes at least one raised portion provided thereon, and
   another one of the second retaining section or the second base section includes at least one groove portion provided thereon in association with the at least one raised portion respectively,
      the at least one raised portion being adapted to interlock with respect to the at least one groove portion.

4. The snap ring assembly of claim 3, wherein the at least one raised portion or the at least one groove portion includes at least one of a tapered longitudinal configuration or a tapered cross-sectional configuration.

5. The snap ring assembly of claim 1, wherein the first base section and the second base section is removably coupled to the first retaining section and the second retaining section respectively using at least one of a fastener or a snapping detent.

6. The snap ring assembly of claim 1, wherein each of the first base section and the second base section includes a stepped portion provided on an inner periphery thereof.

7. The snap ring assembly of claim 1, wherein each of the first base section, the second base section, the first retaining section, and the second retaining section includes a semi-circular configuration.

8. The snap ring assembly of claim 1, wherein at least one of the first base section, the second base section, the first retaining section, or the second retaining section is made of maraging steel.

9. A gear assembly comprising:
a shaft member;
a gear element rotatably mounted on the shaft member; and
a snap ring assembly removably coupled to the shaft member and disposed adjacent to the gear element, the snap ring assembly including:
a base set including a first base section and a second base section,
the first base section being adapted to be disposed adjacent and substantially coplanar with respect to the second base section,
the first base section and the second base section forming a first ring, and
each of the first base section and the second base section adapted to contact the shaft member; and
a retaining set including a first retaining section and a second retaining section,
the first retaining section being adapted to be disposed adjacent and substantially coplanar with respect to the second retaining section,
the first retaining section and the second retaining section forming a second ring that interlocks with the first ring, and
each of the first retaining section and the second retaining section being adapted to be removably coupled to each of the first base section and the second base section.

10. The gear assembly of claim 9, wherein:
one of the first base section or the first retaining section includes at least one raised portion provided thereon, and
another one of the first retaining section or the first base section includes at least one groove portion provided thereon in association with the at least one raised portion respectively,
the at least one raised portion being adapted to interlock with respect to the at least one groove portion.

11. The gear assembly of claim 10, wherein:
one of the second base section or the second retaining section includes at least one raised portion provided thereon, and
another one of the second retaining section or the second base section includes at least one groove portion provided thereon in association with the at least one raised portion respectively,
the at least one raised portion being adapted to interlock with respect to the at least one groove portion.

12. The gear assembly of claim 11, wherein the at least one raised portion and the at least one groove portion includes at least one of a tapered longitudinal configuration and a tapered cross-sectional configuration.

13. A drive assembly comprising:
a gear assembly including:
a shaft member;
a gear element rotatably mounted on the shaft member; and
a thrust washer removably mounted on the shall member and disposed adjacent to the gear element; and
a snap ring assembly removably coupled to the shaft member and disposed adjacent to the thrust washer,
the snap ring assembly including:
a base set including a first base section and a second base section,
the first base section being adapted to be disposed adjacent and substantially coplanar with respect to the second base section,
each of the first base section and the second base section being adapted to contact the shaft member, and
the first base section and the second base section forming a first ring; and
a retaining set including a first retaining section and a second retaining section,
the first retaining section and the second retaining section forming a second ring that interlocks with the first ring,
the first retaining section being adapted to be disposed adjacent and substantially coplanar with respect to the second retaining section, and
each of the first retaining section and the second retaining section being adapted to be removably coupled to each of the first base section and the second base section.

14. The drive assembly of claim 13, wherein:
one of the first base section or the first retaining section includes at least one raised portion provided thereon, and
another one of the first retaining section or the first base section includes at least one groove portion provided thereon in association with the at least one raised portion respectively,
the at least one raised portion being adapted to interlock with respect to the at least one groove portion.

15. The drive assembly of claim 13, wherein:
one of the second base section or the second retaining section includes at least one raised portion provided thereon, and
another one of the second retaining section or the second base section includes at least one groove portion provided thereon in association with the at least one raised portion respectively,
the at least one raised portion being adapted to interlock with respect to the at least one groove portion.

16. The snap ring assembly of claim 1,
wherein the first base section includes a plurality of raised portions, and
wherein the first retaining section includes a plurality of groove portions that are provided in associated with the plurality of raised portions.

17. The snap ring assembly of claim 1,
wherein the first base section includes one or more base bores, and
wherein the first retaining section includes one or more retaining bores that are aligned with respect to the one or more base bores.

18. The gear assembly of claim 9,
wherein the first base section includes a plurality of raised portions, and
wherein the first retaining section includes a plurality of groove portions that are provided in associated with the plurality of raised portions.

19. The gear assembly of claim 9,
wherein the first base section includes one or more base bores, and wherein the first retaining section includes one or more retaining bores that are aligned with respect to the one or more base bores.

20. The drive assembly of claim 13,
wherein the first base section includes a plurality of raised portions, and
wherein the first retaining section includes a plurality of groove portions that are provided in associated with the plurality of raised portions.

* * * * *